(12) United States Patent
Fujimori

(10) Patent No.: US 6,406,151 B1
(45) Date of Patent: Jun. 18, 2002

(54) ELECTRO-OPTICAL DEVICE MOUNTING UNIT AND PROJECTOR USING THE SAME

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/495,170

(22) Filed: Feb. 1, 2000

(30) Foreign Application Priority Data

Feb. 2, 1999 (JP) ............................................ 11-025344

(51) Int. Cl.[7] ........................ G03B 21/14; G03B 21/00; G02F 1/1333
(52) U.S. Cl. ........................ 353/119; 353/122; 353/33; 349/58
(58) Field of Search .............................. 353/119, 31, 33, 353/34, 37, 81, 122, 20; 349/8, 9, 58

(56) References Cited

U.S. PATENT DOCUMENTS

| 5,842,761 A | * | 12/1998 | Futakami et al. | ............ 353/119 |
| 5,868,485 A | * | 2/1999 | Fujimori et al. | ............ 353/119 |
| 6,053,616 A | * | 4/2000 | Fujimori et al. | ............ 353/119 |
| 6,056,407 A | * | 5/2000 | Iinuma et al. | ............... 353/119 |
| 6,128,183 A | * | 10/2000 | Uchiyama et al. | ........... 361/681 |

FOREIGN PATENT DOCUMENTS

| JP | WO95/12142 | 5/1995 | ............. G02F/1/13 |
| JP | 10-10994 | 1/1998 | ............. G09F/9/00 |
| JP | WO98/27453 | 6/1998 | ............. G02F/1/13 |

\* cited by examiner

*Primary Examiner*—Russell Adams
*Assistant Examiner*—Melissa Koval
(74) *Attorney, Agent, or Firm*—Oliff & Berridge, PLC.

(57) ABSTRACT

The invention concerns simplify positioning and fixing operation of a prism unit and a liquid-crystal-panel unit, and a projection display device that reduces a shift of pixels. The projection display device may include a fixed frame plate fixed adjacent to a surface of a prism unit and a center portion thereof being opened, a panel frame body for holding liquid crystal panels, and a spacer having a plane opposed to the fixed frame plate and a plane opposed to the panel frame body, and placed between the fixed frame plate and the panel frame body. The fixed frame plate and the panel frame body are bonded and fixed by an adhesive agent via the spacer, and a bonding section of the fixed frame plate to the spacer protrudes toward the panel frame body.

18 Claims, 15 Drawing Sheets

ELECTRO-OPTICAL DEVICE MOUNTING UNIT AND PROJECTOR USING THE SAME

BACKGROUND OF THE INVENTION

1. Field of Invention

The present invention relates to a unit for mounting an electro-optical device, such as a liquid crystal panel, to a prism, such as a dichroic prism or a polarization beam splitter, and to a projection display device using the same.

2. Description of Related Art

An example of a conventional projection display device relating to the present invention in which an electro-optical device, such as a liquid crystal panel, is mounted to a prism is disclosed, for example, in Japanese Unexamined Patent Publication No. 10-10994. Thus, Japanese Unexamined Patent Publication No. 10-10994 will be briefly described with reference to an exploded view of FIG. 16.

A liquid-crystal-panel unit 70R is mounted to a light-incident surface 72R of a prism composition 72 of a projection display device. The panel unit 70R is composed of an innermost fixed frame body 76 bonded and fixed to the light-incident surface 72R of the prism composition 72, an outermost panel frame body 73 for accommodating and holding a liquid crystal panel 80R, and an intermediate frame body 77 disposed between the fixed frame body 76 and the panel frame body 73. The panel frame body 73 has a first frame body 74 and a second frame body 75, and further holds the liquid crystal panel 80R by sandwiching between these frame bodies 74 and 75.

Engaging projections 77b projected outward from four corners of the intermediate frame body 77 are fitted and bonded into engaging holes 74b formed in four corners of the panel frame body 73 (the first frame body 74 thereof), and a spacer 78 having a substantially triangular prism shape is provided between the intermediate frame body 77 and the panel frame body 73 so as to bond and fix the intermediate frame body 77 and the panel frame body 73.

Process steps for obtaining the above construction will be described hereinbelow with reference to a flow shown in FIG. 17.

That is, the fixed frame body 76 is first located and fixed on the light-incident surface 72R of the prism composition 72 by an adhesive agent (S1). Then, the intermediate frame body 77 is located outside the bonded and the fixed frame body 76, and is fixed by inserting four screws 79 into tapped holes 77a and 76a (S2).

Thereafter, an adhesive agent is charged into the engaging holes 74b that are formed in the first frame body 74 of the panel frame body 73 in which the liquid crystal panel 80R is accommodated and held, and the panel frame body 73 is attached to the intermediate frame body 77 by fitting the engaging projections 77b of the intermediate frame body 77 into the engaging holes 74b (S3).

Next, the liquid crystal panel 80R is turned on in this state (S4), and focus adjustment and alignment adjustment of the liquid crystal panel 80R are performed (S5 and S6). These steps S4 to S6 are performed to adjust the position and the inclination of the liquid crystal panel 80R on the optical axis.

Next, the adhesive agent charged in the engaging holes 74b is hardened to temporarily fix the intermediate frame body 77 and the panel frame body 73 (S7). Thereafter, a shift amount of the position of pixels of the liquid crystal panel 80R is checked (S8). Consequently, when the shift amount is beyond an allowable range (bad), the panel frame body 73 is removed (S13), and the procedure returns to the aforementioned step S3.

On the other hand, when the shift amount is within the allowable range (good), the adhesive agent is applied to the spacer 78 (S9), and the spacer 78 is mounted to a predetermined guide section formed between the temporarily fixed intermediate frame body 77 and the panel frame body 73 (S10). Then,.by hardening the adhesive agent among the spacer 78, the panel frame body 73, and the intermediate frame body 77, the panel frame body 73 is actually fixed to the prism composition 72 (S11).

In the case of the above conventional device, however, the panel frame body is temporarily fixed to the prism after adjusting the position of the liquid crystal panel and then actually fixed at a place different from the temporarily fixed place, resulting in a shift of the position of the liquid crystal panel in an actual fixing step.

In addition, a temporary fixing step differs from the actual fixing step in a bonded section, so that there is a problem in that the operation process is complicated, and the working efficiency is low because a hardening period of the adhesive agent is required for each step.

Also, when the adhesive agent is hardened, the panel frame body is susceptible to displacement due to the contraction of the adhesive agent. However, there is a problem in that the number of bonded sections increases because of the temporary fixing, and hardening of the adhesive agent tends to cause a shift of the position of the liquid crystal panel.

Further, the temporary fixing and the actual fixing are performed at different sections, so that there is a high risk of occurrence of shift of the position of the liquid crystal panel under the influence of expansion or contraction by heat generated by the use of a projection display device. For this reason, there is room for improvement in realizing a projection display device which does not cause a shift of the position of the liquid crystal panel for a long period.

Thus, the present invention proposes a unit which can eliminate a temporary fixing step from steps for fixing an electro-optical device, such as a liquid crystal panel, to a prism and which can mount a panel frame body for accommodating and holding the electro-optical device, such as the liquid crystal panel, to the prism only by a spacer section, and a projection display device using the same to thereby achieve an increase in fixing and positioning accuracy of the electro-optical device, an increase in fixing operation efficiency, and simplification of the fixing operation.

SUMMARY OF THE INVENTION

A projection display device is provided having an electro-optical device for modulating light, a prism to which the electro-optical device is mounted, and a projection lens for projecting modulated light. The projection display device may include: a fixed frame plate fixed adjacent to a surface of the prism and a center portion thereof being opened, an electro-optical device frame body for holding the electro-optical device, and a spacer having a plane opposed to the fixed frame plate and a plane opposed to the electro-optical device frame body, and placed between the fixed frame plate and the electro-optical device frame body. The fixed frame plate and the electro-optical device frame body may be bonded and fixed by an adhesive agent via the spacer, and a bonded surface of the fixed frame plate to the spacer may protrude toward the electro-optical device frame body.

In addition, an electro-optical device mounting unit for mounting an electro-optical device for modulating light to a prism, may include: a fixed frame plate fixed adjacent to a surface of the prism and a center portion thereof being opened, an electro-optical device frame body for holding the electro-optical device, and a spacer having a plane opposed to the fixed frame plate and a plane opposed to the electro-optical device frame body, and placed between the fixed frame plate and the electro-optical device frame body. The fixed frame plate and the electro-optical device frame body may be bonded and fixed by an adhesive agent via the spacer, and a bonded surface of the fixed frame plate to the spacer may protrude toward the electro-optical device frame body.

Accordingly, a distance between the effective center of the bonded surfaces of the spacer and the fixed frame plate and the effective center of the bonded surfaces of the spacer and the electro-optical device frame body can be effectively reduced while maintaining the clearance between the prism and the electro-optical device constant, so that the rotational moment exerted on the spacer can be reduced and falling thereof can be prevented during position adjustment operation in fixing the electro-optical device frame body and the fixed frame plate. Therefore, productivity improvement can be achieved. In addition, the stability of the spacer makes it possible to fix the electro-optical device frame body to the fixed frame plate, that is, to actually fix the electro-optical device to the prism using the adhesive agent only to the spacer, whereby bonding places and the number of bonding operations are decreased, and a shift of a position of the electro-optical device can be reduced.

In addition, the bonded surface of the fixed frame plate to the spacer may protrude from the outer periphery of the prism. According to this, a bonding area of the spacer to the fixed frame plate can be increased, so that the spacer can be stabilized to reduce its tendency to fall, and productivity is increased. Further, the stability of the spacer makes it possible to actually fix the fixed frame plate and the electro-optical device using the adhesive agent only to the spacer, whereby bonding places and the number of bonding operations are decreased, and a shift of a position of the electro-optical device can be reduced.

Also, a clearance between a line passing through the center of the bonded surfaces of the fixed frame plate and the spacer and perpendicular to the surface of the prism and a line passing through the center of the bonded surfaces of the electro-optical device frame body and the spacer and perpendicular to the surface of the prism, is equal to or smaller than 2 mm. According to this, the rotational moment exerted on the spacer is significantly reduced during a position adjustment operation in fixing the electro-optical device frame body and the fixed frame plate. Therefore, falling of the spacer can be prevented and productivity improvement can be achieved. Further, the stability of the spacer makes it possible to actually fix the fixed frame plate and the electro-optical device, using the adhesive agent, only to the spacer, whereby bonding places and the number of bonding operations are decreased, and a shift of a position of the electro-optical device can be reduced.

In addition, a width of a frame portion connected to the bonded surface of the fixed frame plate to the spacer is narrower than a width of the surface of the fixed frame plate that is bonded to the spacer. According to this, elasticity (springiness) of the frame portion of the fixed frame plate connected to the spacer is increased, so that the influence of temperature change at the bonded portion of the prism and the electro-optical device can be absorbed by this portion and therefore, a shift of a position based on the temperature change, that is, a shift of pixels, is reduced.

Further, the bonded surface of the fixed frame plate to the spacer is formed by a plate added to a base plate constituting the fixed frame plate. According to this, the stress of the spacer to the adhesive agent can be arbitrarily lightened using a plate whose thickness and size (width and length) can be changed. That is, a member having substantially an intermediate linear expansion coefficient between a linear expansion coefficient of the electro-optical device frame body and a linear expansion coefficient of the prism, is used as the additional plate member, whereby the shift of pixels of the electro-optical device caused by the mutual shift amount due to the temperature change can be effectively relieved. As a specific example of the additional plate, the use of metal, such as iron, may be considered when, for example, the prism is made of glass and the electro-optical device frame body is made of resin.

In addition, by using an additional plate member having a suitable size, stabilization of the spacer can be achieved.

BRIEF DESCRIPTION OF THE DRAWINGS

FIGS. 110(A)–10(C) include sectional views each showing a shape of the spacer used in the embodiment of the present invention;

DETAILED DESCRIPTION OF PREFERRED EMBODIMENTS

Figure 1:
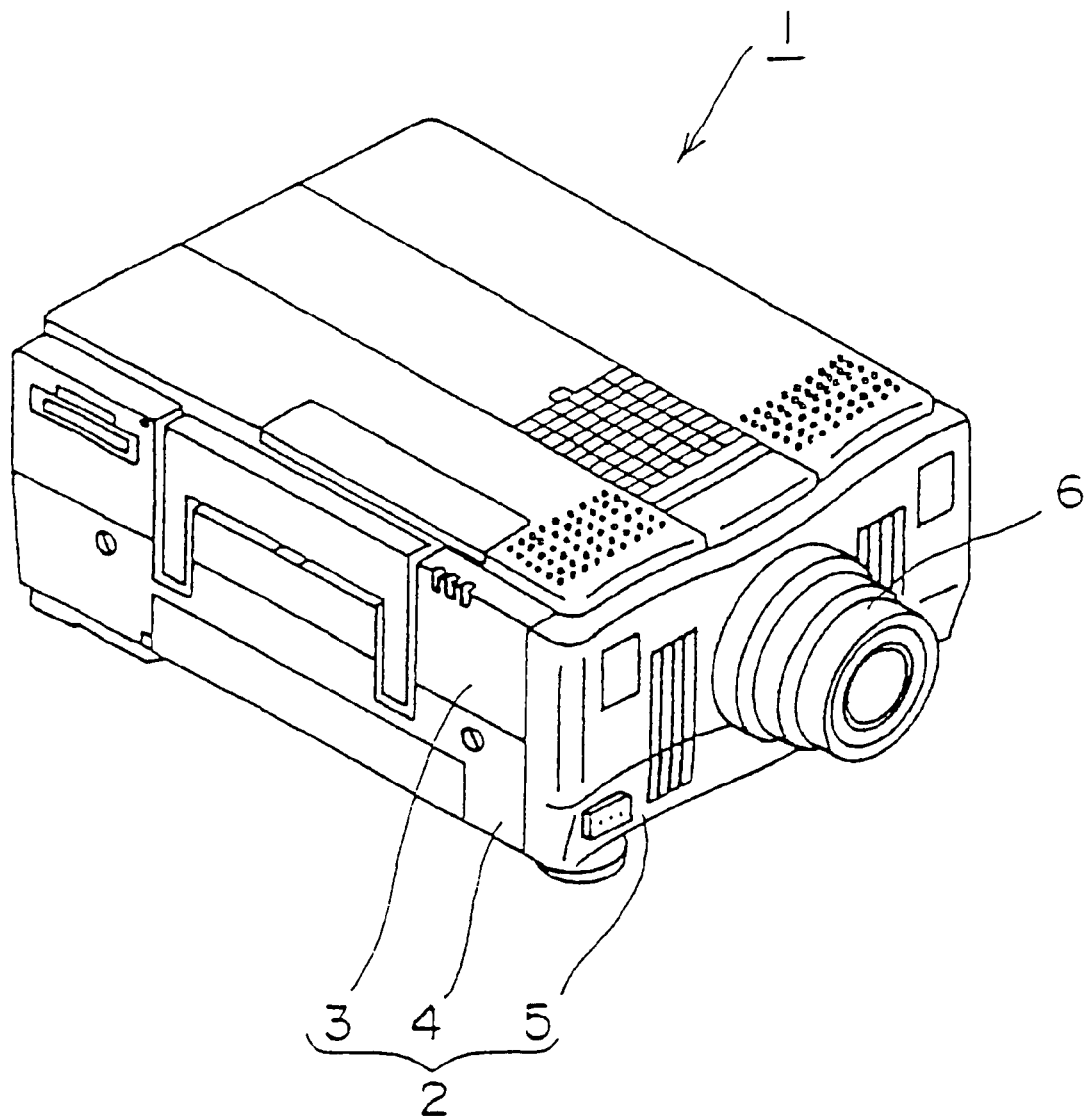
FIG. 1 is a perspective view showing an external appearance of a projection display device to which the present invention is applied.

Next, a preferred embodiment of the present invention will be described with reference to the drawings. FIG. 1 shows an external appearance of a projection display device to which a method according to the present invention is applied. An outer casing 2 of a projection display device 1 of this embodiment is shaped like a rectangular parallelepiped. The outer casing 2 is basically composed of an upper casing 3, a lower casing 4, and a front casing 5 for defining the front of the device. The leading end of a projection lens unit 6 protrudes from the center of the front casing 5.

Figure 2A:
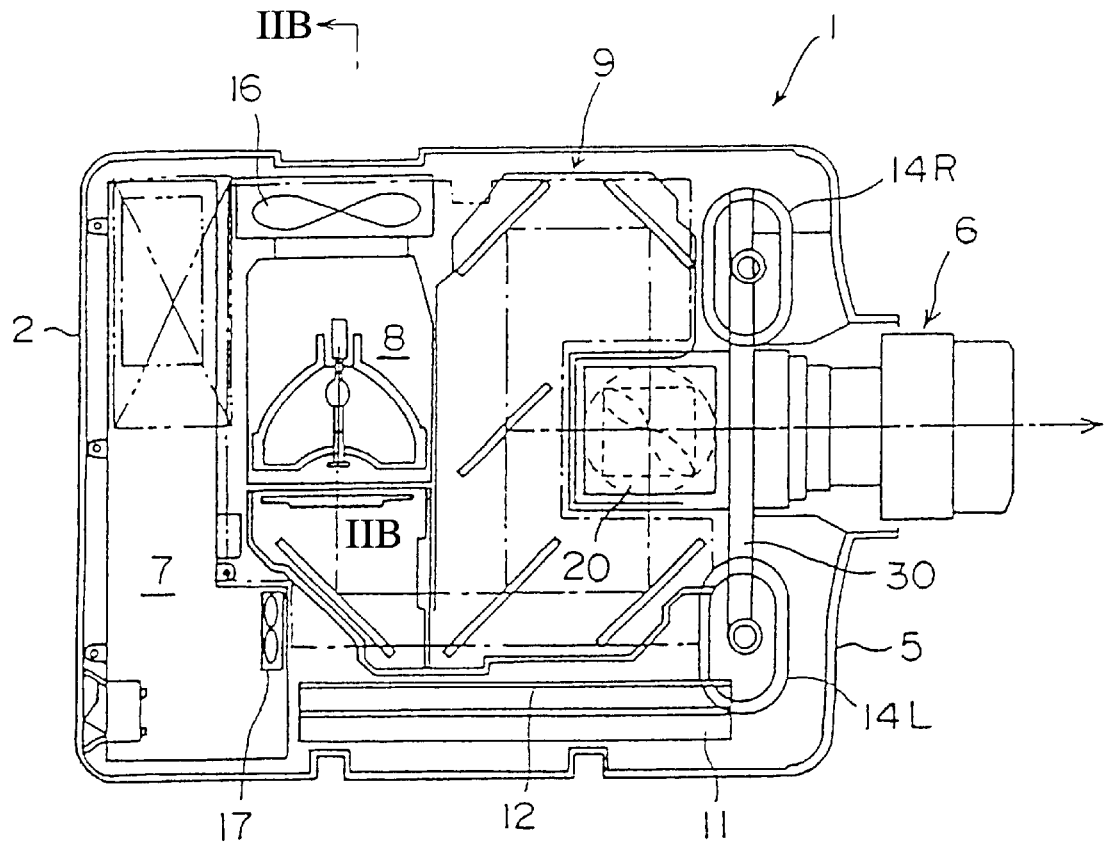
FIG. 2(A) is a diagram showing the two-dimensional layout of components inside the device shown in FIG. 1.
Figure 2B:
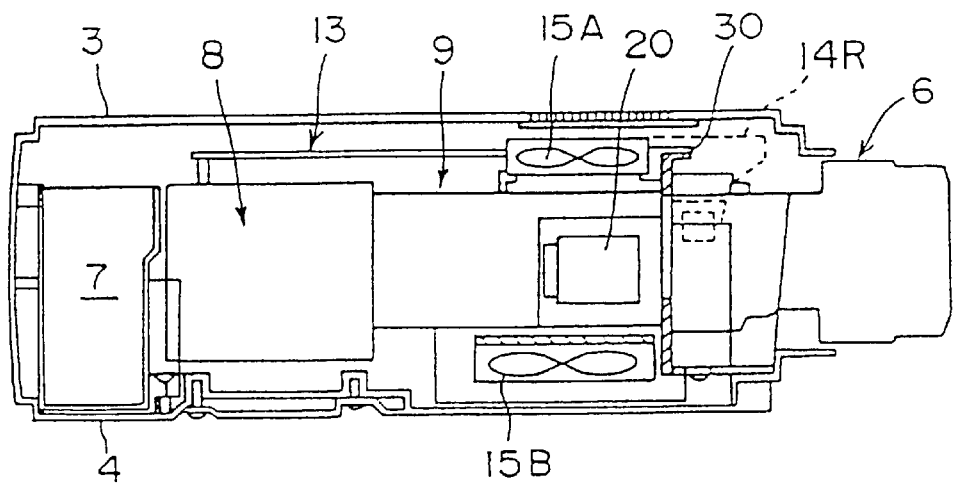
FIG. 2(B) is a diagram showing the three-dimensional layout of the components.

FIG. 2 shows the layout of components inside the outer casing 2 of the projection display device 1. As shown in this figure, in the outer casing 2, a power supply unit 7 is placed on the rear end of the inside of the outer casing 2. A light source lamp unit 8 and an optical unit 9 are placed at positions next to and offset from the power supply unit 7 toward the front side of the device. Further, positioned at the front center of the optical unit 9 is the base end of the projection lens unit 6.

On the other hand, an interface substrate 11 with an input-output interface circuit mounted thereon is located on the side of the optical unit 9 so that it extends toward the front and rear of the device, and a video substrate 12 with a video signal processing circuit mounted thereon is located in parallel therewith. Further, a control substrate 13 for controlling driving of the device is placed above the light source lamp unit 8 and the optical unit 9, and speakers 14R and 14L are placed at the right and left front corners of the device, respectively.

Suction fans 15A and 15B for cooling the inside of the device are placed above and below the optical unit 9. In addition, an exhaust fan 16 is placed on the side face of the device, that is, at the rear of the light source lamp unit 8. Moreover, an auxiliary cooling fan 17 for sucking the cooling air stream from the suction fan 15A into the power supply unit 7 is placed at the position in the power supply unit 7 opposed to the ends of the substrates 11 and 12.

Of these fans, the fan 15B mainly serves as a fan for cooling liquid crystal panels 40R, 40G, and 40B to be described hereinbelow. The fan 15A can be used for cooling the liquid crystal panels 40R, 40G, and 40B.

Next, configurations of the optical unit 9 and an optical system will be described with reference to FIG. 3.

Figure 3A:
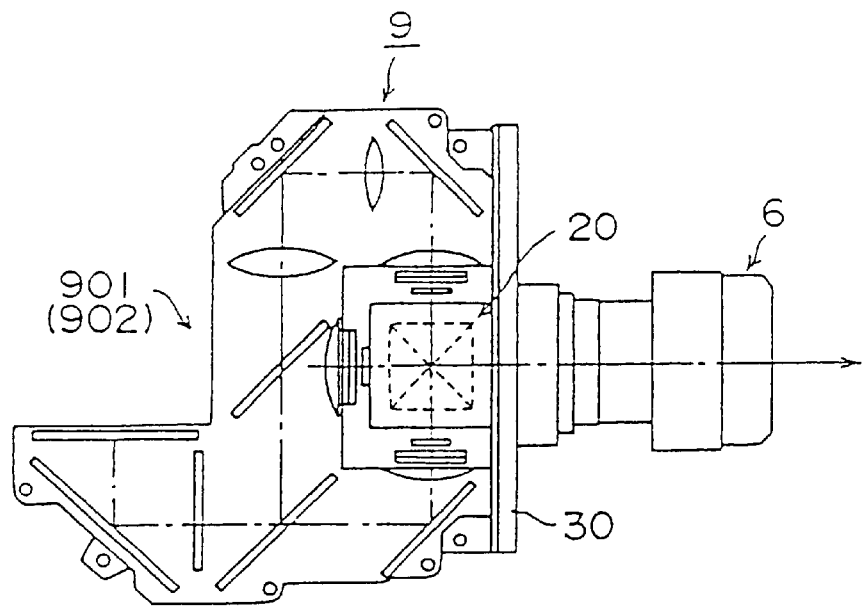
FIG. 3(A) is a diagram showing an optical lens unit and a projection lens unit.

FIG. 3(A) shows the optical unit 9. As shown in this figure, optical elements other than a prism unit 20 constituting a color synthesizer thereof are vertically sandwiched and held between upper and lower light guides 901 and 902. The upper light guide 901 and the lower light guide 902 are fixed by fixing screws on the sides of the upper casing 3 and the lower casing 4, respectively. In addition, these upper and lower light guides 901 and 902 are similarly fixed on the side of the prism unit 20 by fixing screws.

The prism unit 20 is fixed by fixing screws on the rear of a thick head plate 30 formed of a die-cast plate. The base end of the projection lens unit 6 serving as a projection unit is similarly fixed on the front of the head plate 30 by fixing screws. Therefore, in this embodiment, a structure is such that the head plate 30 is sandwiched, and the prism unit 20 and the projection lens unit 6 are fixed so as to be combined.

Figure 3B:
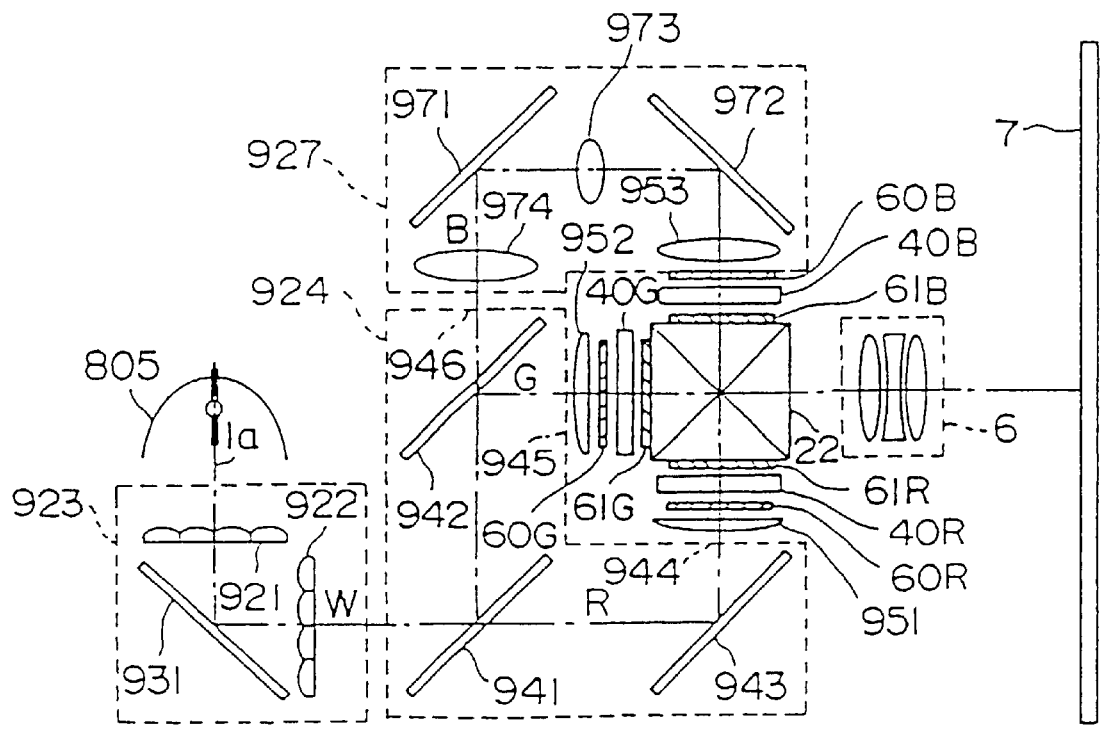
FIG. 3(B) schematically illustrates a configuration of an optical system.

FIG. 3(B) schematically shows the configuration of an optical system incorporated in the projection display device 1. The optical system of this embodiment is composed of a light source lamp 805, a uniform illuminating optical system 923 having integrator lenses 921 and 922 which are uniform illuminating optical elements, a color separation optical system 924 for separating a luminous flux W emitted from the illuminating optical system 923 into red, green, and blue luminous fluxes R, G, and B, three liquid crystal panels 40R, 40G, and 40B serving as electro-optical devices for modulating the color luminous fluxes, a prism composition 22 serving as a color synthesizing optical system for synthesizing modulated color luminous fluxes, and a projection lens unit 6 for enlarging and projecting the synthesized luminous flux onto a projection plane. In addition, the optical system includes a relay optical system 927 for guiding a blue luminous flux B in the color luminous fluxes separated by the color separation optical system 924 to the corresponding liquid crystal panel 40B.

The uniform illuminating optical system 923 further includes a reflecting mirror 931 so as to bend an optical axis 1a of light emitted from the light source lamp 805 into right angles toward the front of the device. The integrator lenses 921 and 922 intersect at right angles so that the reflecting mirror 931 is located therebetween.

The color separation optical system 924 is composed of a blue-and-green-reflecting dichroic mirror 941, a green-reflecting dichroic mirror 942, and a reflecting mirror 943. First, the blue luminous flux B and the green luminous flux G contained in the luminous flux W passing through the uniform illuminating optical system 923 are reflected at right angles by the blue-and-green-reflecting dichroic mirror 941, and directed toward the green-reflecting dichroic mirror 942. The red luminous flux R passing through the mirror 941, is reflected at right angles by the reflecting mirror 943 located behind, and is emitted from an emitting section 944 for the red luminous flux toward the color synthesizing optical system. Next, only the green luminous flux G of the blue and green luminous fluxes B and G reflected by the mirror 941 is reflected at right angles by the green-reflecting dichroic mirror 942, and is emitted from an emitting section 945 for the green luminous flux toward the color synthesizing optical system. The blue luminous flux B passing through the mirror 942 is emitted from an emitting section 946 for the blue luminous flux toward the relay optical system 927. In this embodiment, all the distances between the emitting section for the luminous flux of the uniform illuminating optical element 923 and the emitting sections 944, 945, and 946 are substantially equally set.

Condenser lenses 951 and 952 are placed on the emitting sides of the emitting sections 944 and 945 for the red luminous flux and the green luminous flux in the color separation optical system 924. Therefore, the red luminous flux and the green luminous flux emitted from the emitting sections respectively enter the condenser lenses 951 and 952, where they are collimated.

The red and green luminous fluxes R and G thus collimated enter the liquid crystal panels 40R and 40G, are modulated, and given image information corresponding thereto after the polarization direction thereof has been adjusted by polarizers 60R and 60G. That is, these liquid crystal panels 40R and 40G are subjected to switching control according to image information by a drive unit (not shown), whereby the color light passed therethrough is modulated. As such a drive unit, a well-known drive unit may be used.

On the other hand, the blue luminous flux B, after the polarization direction is further adjusted by the polarizer 60B, is guided to the corresponding liquid crystal panel 40B via the relay optical system 927, where it is similarly modulated according to image information. The liquid crystal panels 40R, 40G, and 40B of this embodiment using, for example, a polysilicon TFT as a switching element, may be used.

The relay optical system 927 is composed of a condenser lens 974, an incident-side reflecting mirror 971, an emitting-side reflecting mirror 972, an intermediate lens 973 interposed between these mirrors, and a condenser lens 953 placed upstream of the liquid crystal panel 40B. The blue luminous flux B of the color luminous fluxes has the longest optical path length, that is, the distance between the light source lamp 805 and the liquid crystal panel for the blue luminous flux B is the longest, and therefore, the amount of light of the blue luminous flux B to be lost is the largest. The light loss can, however, be restricted by interposing the relay optical system 927 therebetween.

The color luminous fluxes modulated through the liquid crystal panels 40R, 40G, and 40B enter polarizers 61R, 61G, and 61B, respectively, and light beams transmitted thereby are allowed to enter a prism composition 22, where they are synthesized. In this embodiment, a color synthesizing optical system is formed using the prism composition 22 including a dichroic prism. A color image synthesized by the prism composition 22 is enlarged and projected via the projection lens unit 6 onto a projection plane 7 located at a predetermined position.

Figure 4:
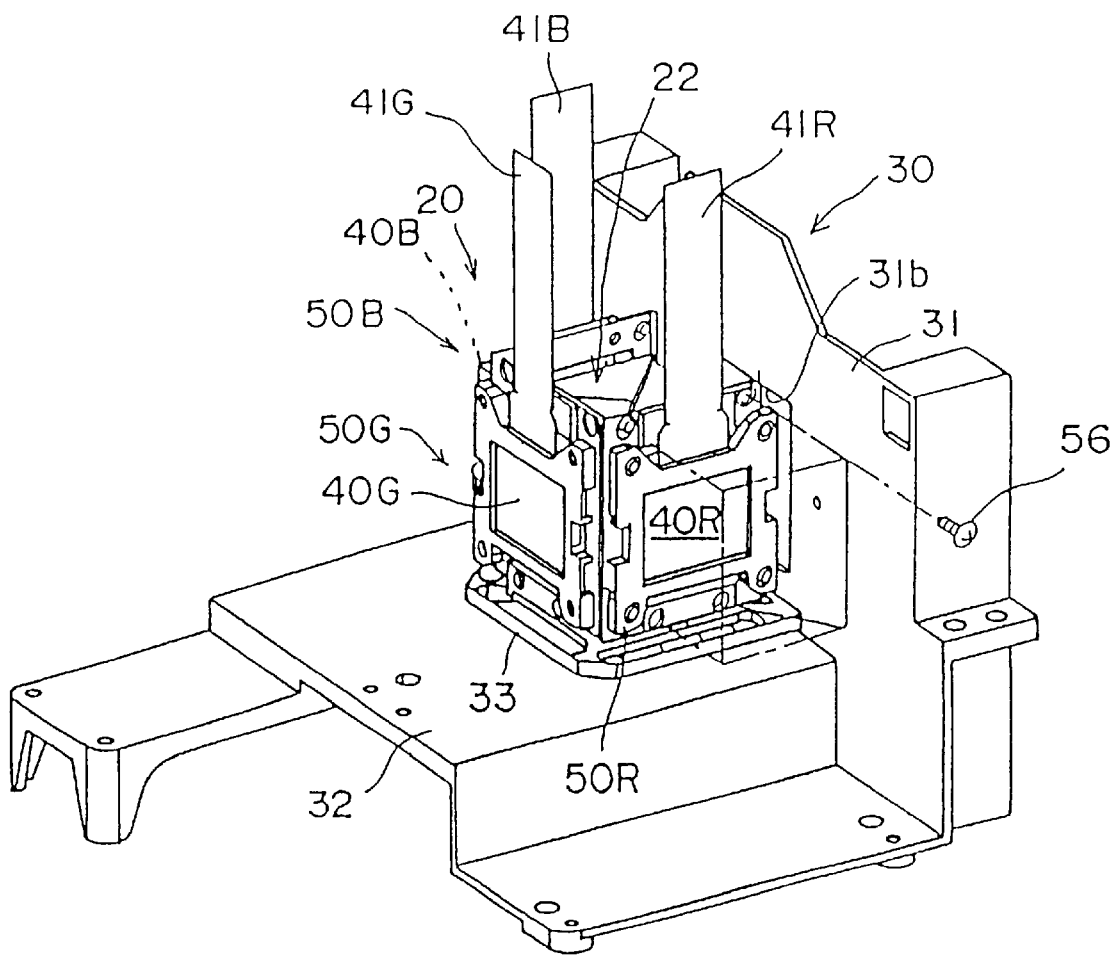
FIG. 4 is a perspective view showing the relationship among a head plate, a prism unit, and a liquid-crystal-panel unit.

Next, configurations of the prism unit 20 and the head plate 30 will be described with reference to FIG. 4. FIG. 4 shows the head plate 30, the prism unit 20 attached to the head plate 30, and liquid-crystal-panel units 50R, 50G, and 50B. As shown in this figure, the head plate 30 is basically composed of a vertical wall 31 extending along a width direction of the device in a vertical attitude, and a bottom wall 32 extending horizontally from the lower end of the vertical wall 31. A rectangular opening 31b is formed in the vertical wall 31 for passing therethrough light emitted from the prism unit 20. In addition, a number of reinforcing ribs are formed on the vertical wall 31 to increase rigidity thereof. The prism unit 20 and the projection lens unit 6 are fixed with the vertical wall 31 sandwiched and aligned (see FIG. 3(A)). Therefore, the integrity of these components is high, and there is very little risk of occurrence of a mutual shift of the positions thereof.

The prism unit 20 is placed on a top face of the bottom wall 32 of the head plate 30. The prism unit 20 includes the prism composition 22 shaped like a rectangular parallelepiped formed by bonding inclined planes of four prisms 21, each of which is substantially an equilateral triangle in cross section, and a prism support plate 33 (see FIG. 5). The bottom of the prism composition 22 is fixed to the surface of the prism support plate 33 by bonding, or the like, and the prism support plate 33 is attached and fixed to the bottom wall 32 of the head plate. Attached to three side faces serving as light-incident surfaces in side faces of the prism composition 22 are liquid-crystal-panel units 50R, 50G, and 50B including the liquid crystal panels 40R, 40G, and 40B, respectively.

Figure 5:
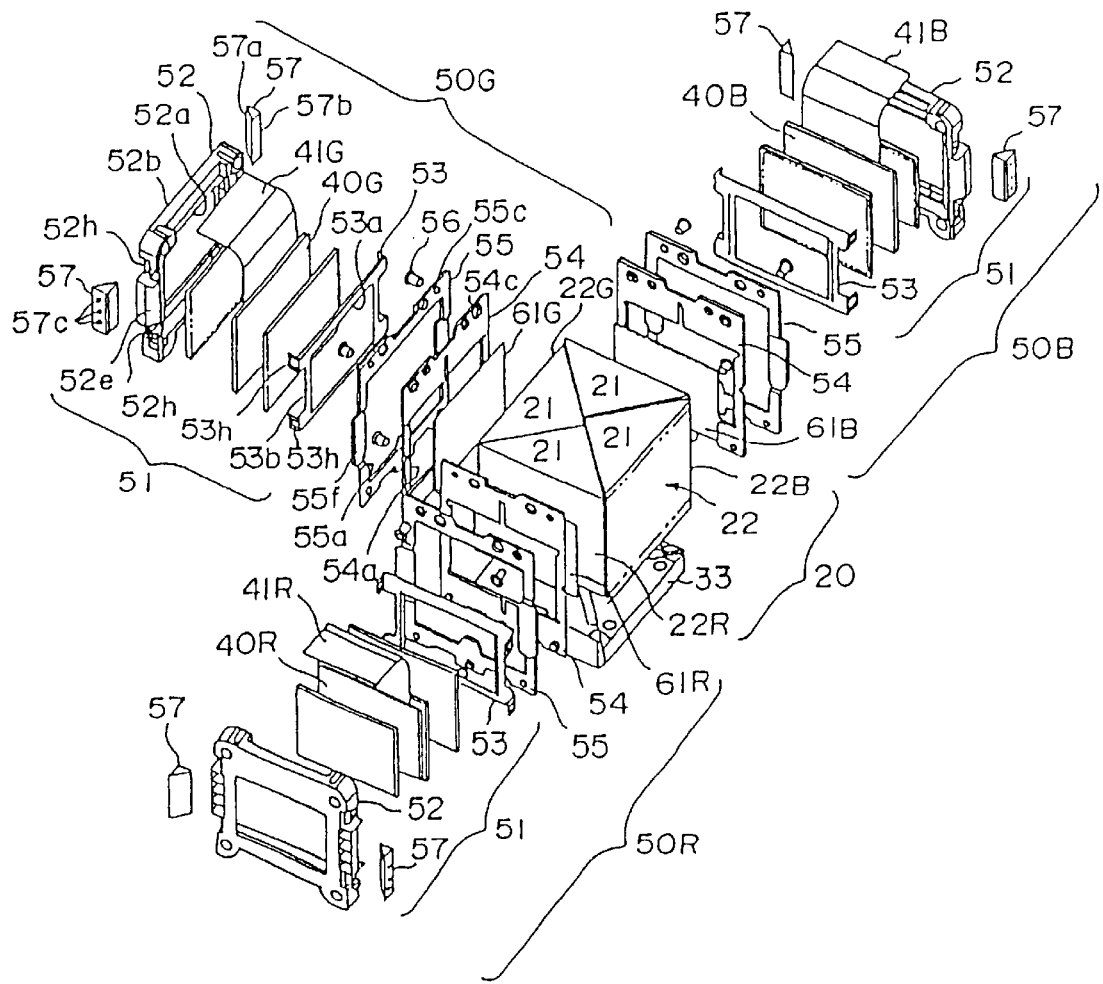
FIG. 5 is an exploded perspective view showing components of the liquid-crystal-panel unit.
Figure 6:
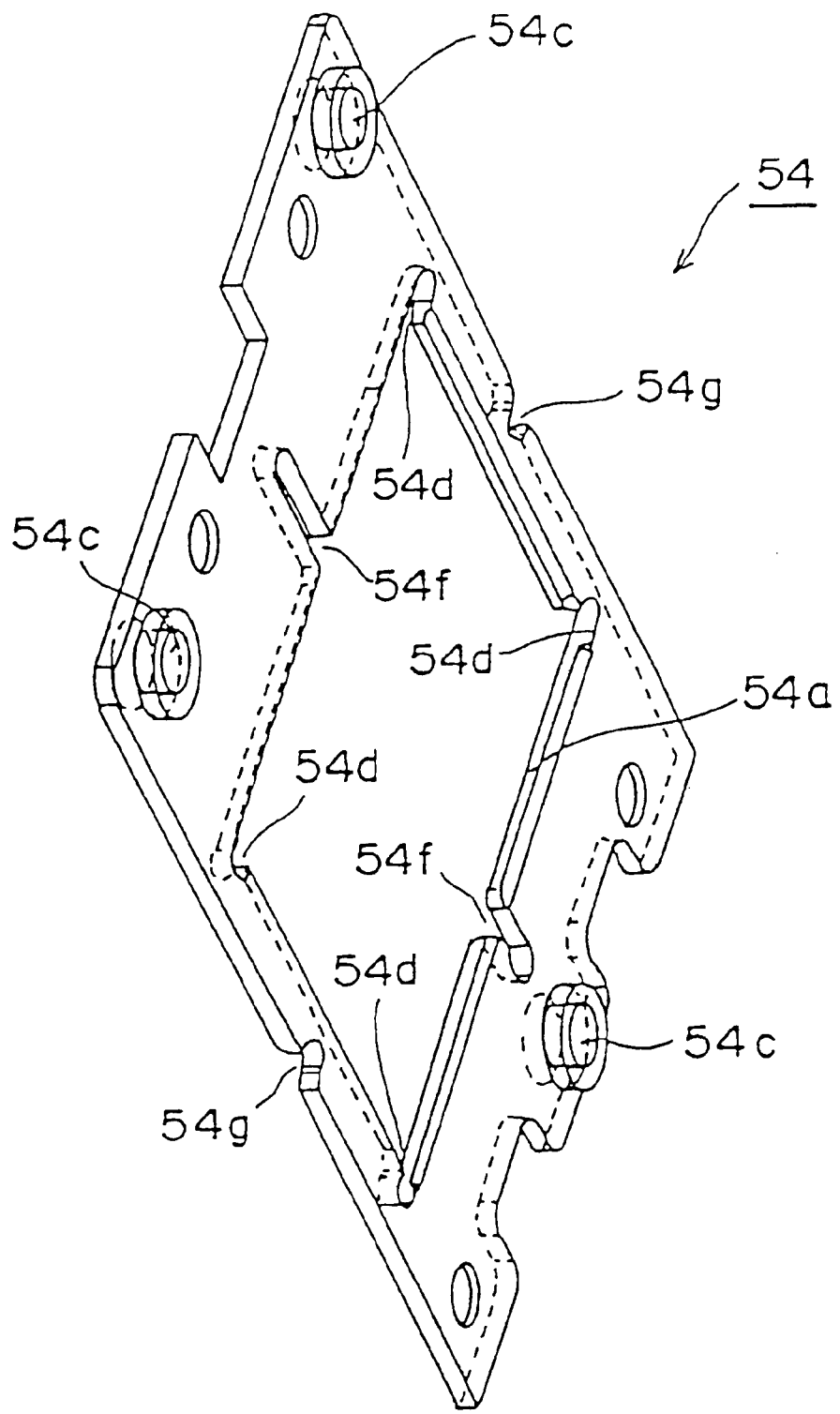
FIG. 6 is a perspective view showing a lower fixed frame body used in an embodiment of the present invention.
Figure 7:
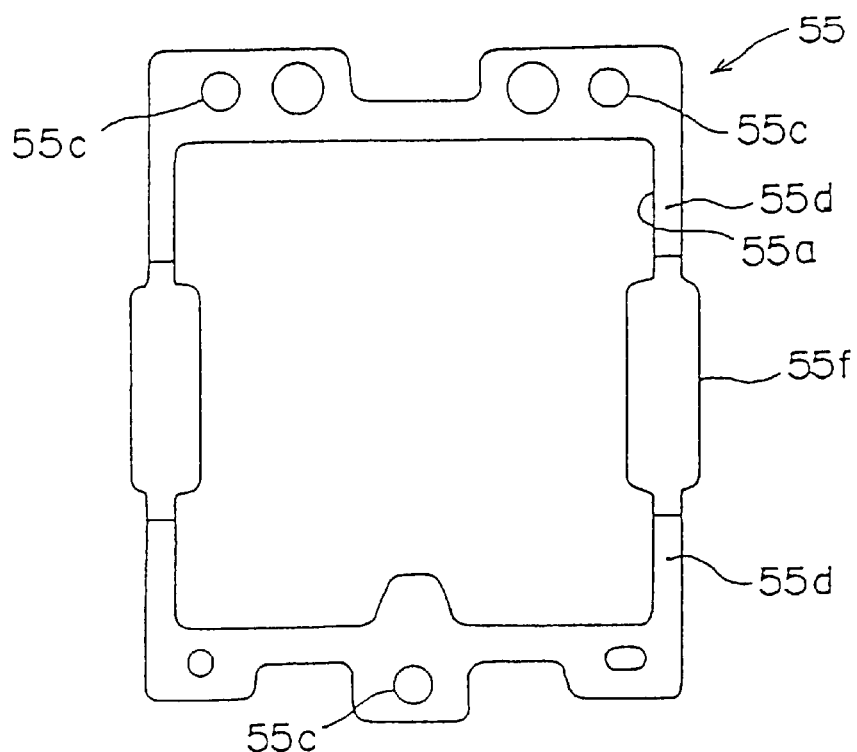
FIG. 7 is a front view showing an upper fixed frame body used in the embodiment of the present invention.
Figure 8:
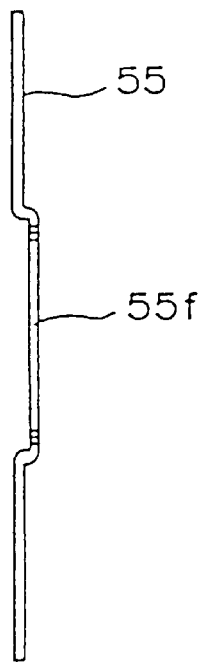
FIG. 8 is a side view of the upper fixed frame body shown in FIG. 7.
Figure 9:
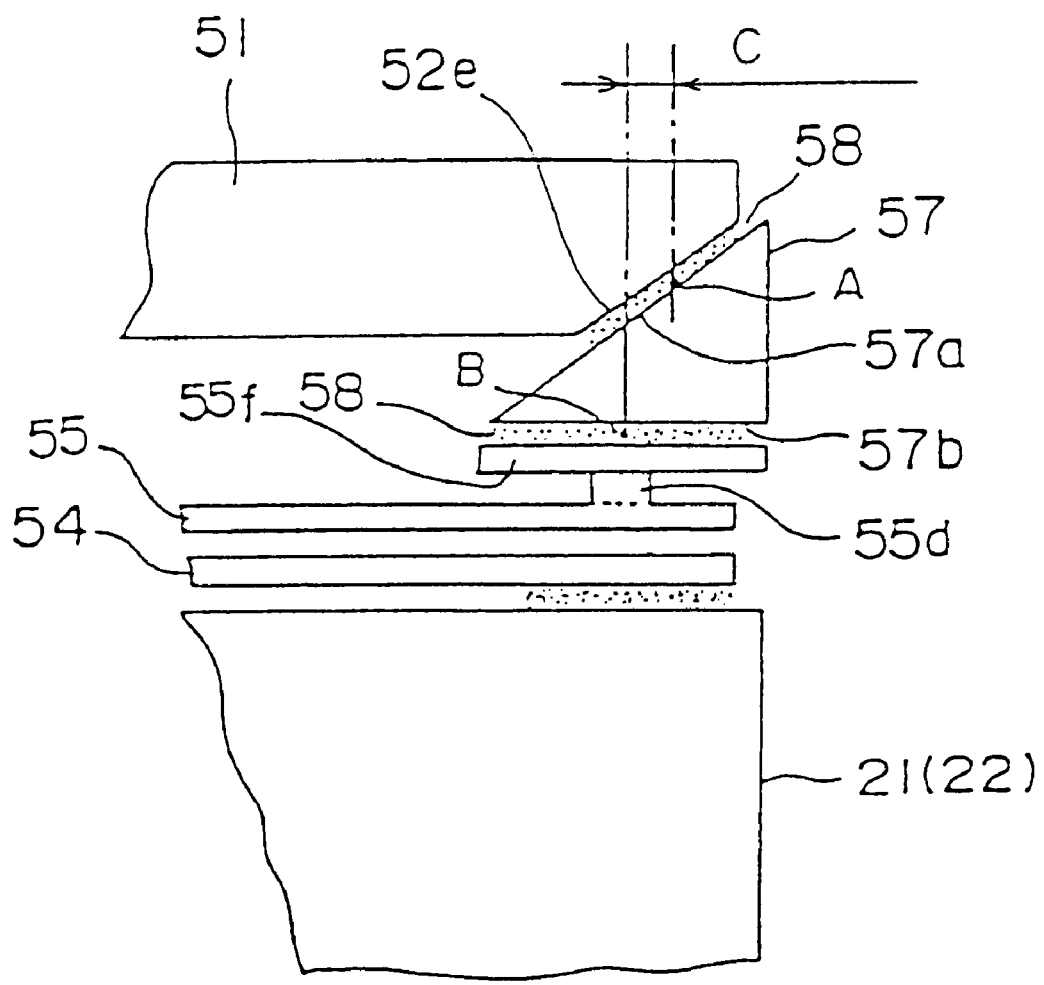
FIG. 9 is a schematic diagram showing a configuration around a spacer of the liquid-crystal-panel unit.

Next, a description will be given of configurations of the liquid-crystal-panel units 50R, 50G, and 50B attached to the prism unit 20 (or the prism composition 22) and characterizing this embodiment with reference to FIGS. 5 to 10. Here, FIG. 5 is an exploded view of components of the liquid-crystal-panel units 50R, 50G, and 50B; FIG. 6 is a perspective view of a lower fixed frame plate 54 bonded and fixed to the prism composition 22; FIG. 7 is a front view of an upper fixed frame plate 55 fixed to the lower fixed frame plate 54 by screws; FIG. 8 is a side view of the upper fixed frame plate 55; FIG. 9 is a schematic diagram showing a configuration around a spacer 57 of a liquid-crystal-panel unit attached to the prism composition 22; and FIGS. 10(A)–10(C) include sectional views each showing a shape of the spacer 57.

Since the liquid-crystal-panel units 50R, 50G, and 50B are of the same configuration, the liquid-crystal-panel unit 50G will be mainly described hereinbelow. When the figure is easy-to-see according to an angle thereof, however, the description will be given with reference to units of 5OR and 50B.

The liquid-crystal-panel unit 50G includes a panel frame body 51 (electro-optical device frame body) for accommodating and holding therein the liquid crystal panel 40G that is an electro-optical device.

The liquid-crystal-panel unit 50G also includes the lower fixed frame plate 54 bonded and fixed to a light-incident surface 22G of the prism composition 22, and the upper fixed frame plate 55 fixed by screws to the lower fixed frame plate 54. These fixed frame plates 54 and 55 are interposed between the panel frame body 51 and the prism composition 22 to play a role, such as for facilitating attachment and detachment operations of the panel frame body 51 to and from the prism composition 22.

In order to position and fix the liquid crystal panel 40G to the prism composition 22, the liquid-crystal-panel unit 50G further includes spacers 57 at the left and right sides thereof, respectively, which are provided between the upper fixed frame plate 55 and the panel frame body 51 for fixing them via an adhesive agent 58.

The panel frame body 51 includes a first frame body 52 placed on the side of the light source (outside), and a second frame body 53 placed on the side of the prism composition 22 (inside). The liquid crystal panel 40G is clamped between these frame bodies. A member extending upward from the panel frame body 51 is a wiring flexible cable 41G.

The first frame body 52 is basically a rectangular frame body having a rectangular opening 52a formed in the inner area and a peripheral wall 52b having a fixed width. The peripheral wall 52b has a space provided inside thereof for accommodating therein the liquid crystal panel, and inclined planes (spacer guide planes) 52e provided on the center of left and right sides thereof which expand to the outside opposed to inclined planed 57a of the spacers 57. Further, engaging sections 52h engaging with the second frame body 53 are provided on both sides of the respective spacer guide planes 52e.

If the first frame body 52 is a molded article of thermosetting resin into which carbon fiber or calcium carbonate is mixed, thermal expansion coefficient thereof nears that of glass constituting the prism, as compared with a general resin material. For this reason, a shift of pixels due to thermal deformation can be reduced in a state where it is fixed to the prism composition 22.

The second frame body 53 is intended to hold the liquid crystal panel accommodated in the first frame body 52, and is a plate frame body having a rectangular opening 53a formed in the inner area thereof. Hooks 53h engaging with the engaging sections 52h of the first frame body 52 are formed on left and right outsides of the second frame body 53.

These first frame body 52 and the second frame body 53 are fitted to each other by the hooks 53h of the second frame body 53 being engaged with the engaging sections 52h of the first frame body 52.

Next, the upper fixed frame plate 55 used in this embodiment will be described with reference to a front view of FIG. 7 and a side view of FIG. 8.

As shown in FIG. 7, the upper fixed frame plate 55 is basically a plate rectangular frame body having a light-passing rectangular opening 55a formed in the inner area thereof. Further, the upper fixed frame plate 55 has spacer bonding portions 55f which are formed by protruding vertical central portions of the left and right side frames thereof from other portions and bending the portions, and the upper fixed frame plate 55 and the bottom face 57b of the spacer 57 are bonded and fixed thereto. In addition, the width of frame portions 55d connected to the spacer bonding portions 55f is reduced to be narrower than that of the spacer bonding portions 55f so as to increase elasticity. The elastic portions 55d have the function of lightening a stress to the adhesive agent interposed between the spacers 57 and the elastic portions 55f and of reducing a shift of pixels by being elastically deformed when the upper fixed frame plate 55 is expanded or contracted by heat or the like.

Holes 55c formed in the upper frame and the lower frame of the upper fixed frame plate 55 are tapped holes for fixing the upper fixed frame plate 55 to the lower fixed frame plate 54 to be described hereinbelow.

On the other hand, the lower fixed frame plate 54 is a plate rectangular frame body having a light-passing rectangular opening 54a formed in the inner area thereof. The rear face of the lower fixed frame plate 54 is fixed by an adhesive agent to the light-incident surface 22G of the prism composition 22.

Tapped holes 54c corresponding to the aforementioned tapped holes 55c of the upper fixed frame plate 55 are formed in the upper and lower frames of the lower fixed frame plate 54. Flat head screws 56 for fastening are inserted into these tapped holes 54c and 55c, whereby the upper fixed frame plate 55 is fixed to the lower fixed frame plate 54. While these fixed frame plates are fixed by three screws in this embodiment, the number of screws and the layout thereof can be suitably determined according to demand. In addition, the lower fixed frame plate 54 and the upper fixed frame plate 55 may be detachably fixed using solder, adhesive agents, and clips, etc. instead of the screws.

The lower fixed frame plate 54 further includes elongated slits 54f formed near the center of the inside of the upper and lower side frames, slits 54d cut into corners of the opening edge toward the left and right side frames, and slits 54g cut inward near the centers of the left and right side frames. These slits 54f, 54d, and 54g have the function similar to that of the elastic portions 55d of the upper fixed frame plate 55. That is, when the lower fixed frame plate 54 is expanded or contracted by heat, these slits are elastically deformed to thereby lighten the stress to the adhesive agent interposed between the prism composition 22 and the slits.

While the upper fixed frame body and the lower fixed frame body are separately prepared and then are combined, these frame bodies may be, for example, integrally molded as a fixed frame body.

The inclined planes 57a of the spacers 57 are fixed by the adhesive agent 58 to the spacer guide planes 52e formed on the vertical center of left and right side frames of the first frame body 52.

In addition, the bottom faces 57b of the spacers 57 are placed at vertical center positions of the left and right side frames of the second frame body 53 so as to face the upper fixed frame plate 55 from inwardly cut out spacer exposing ports 53b, and are fixed by the adhesive agent 58 to the spacer bonding sections 55f which are protruded planes of the upper fixed frame plate 55.

Figure 10A:
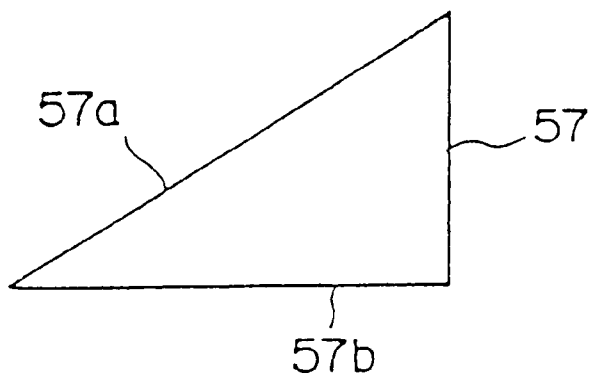
Figure 10B:
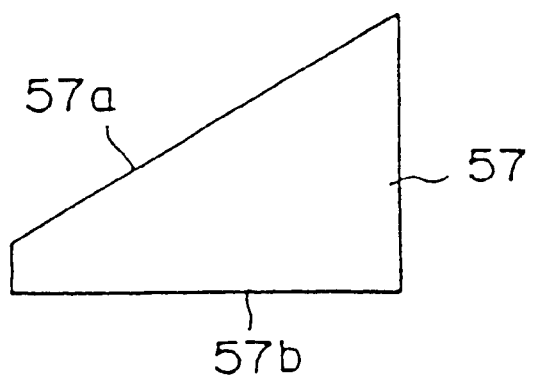
Figure 10C:
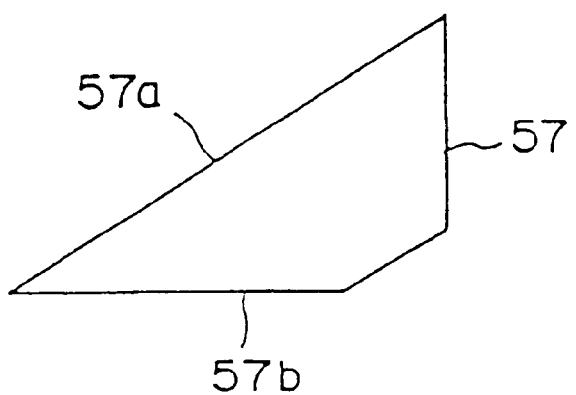

The shape of the spacer 57 is basically a triangular prism shape having a cross-sectional shape shown in FIG. 10(A), however, the spacer 57 may be shaped to have a cross section shown in FIG. 10(B) or FIG. 10(C) in which any one of the corners is cut off.

If blind holes 57c are formed in the back faces of the spacers 57, as shown in FIG. 5, they can be conveniently used as engaging portions for chucking when the spacers 57 are handled using jigs.

In general, a spacer made of glass can be used as the spacer 57. However, when the first frame body 52 is a resin molded article, the thermal expansion coefficient thereof is large, as compared with the glass and therefore, the spacer 57 may preferably be an acrylic resin molded article or the like in order to prevent the spacer 57 from being easily separated from the frame body due the difference in thermal expansion or from being damaged by temperature change.

In addition, the spacer 57 can be molded by being formed by an acrylic material, so that cost reduction can be achieved substantially, as compared with glass.

Further, if a material for transmitting ultraviolet rays is used for the material of the spacer 57, a ultraviolet hardening-type adhesive of less temperature rise and having short hardening period can be used for the adhesive agent for bonding and fixing the spacer 57.

Next, a method for mounting the liquid-crystal-panel units 50R, 50G, and 50B to the prism unit 20 will be described in detail with reference to a flow shown in FIG. 11.

Figure 11:
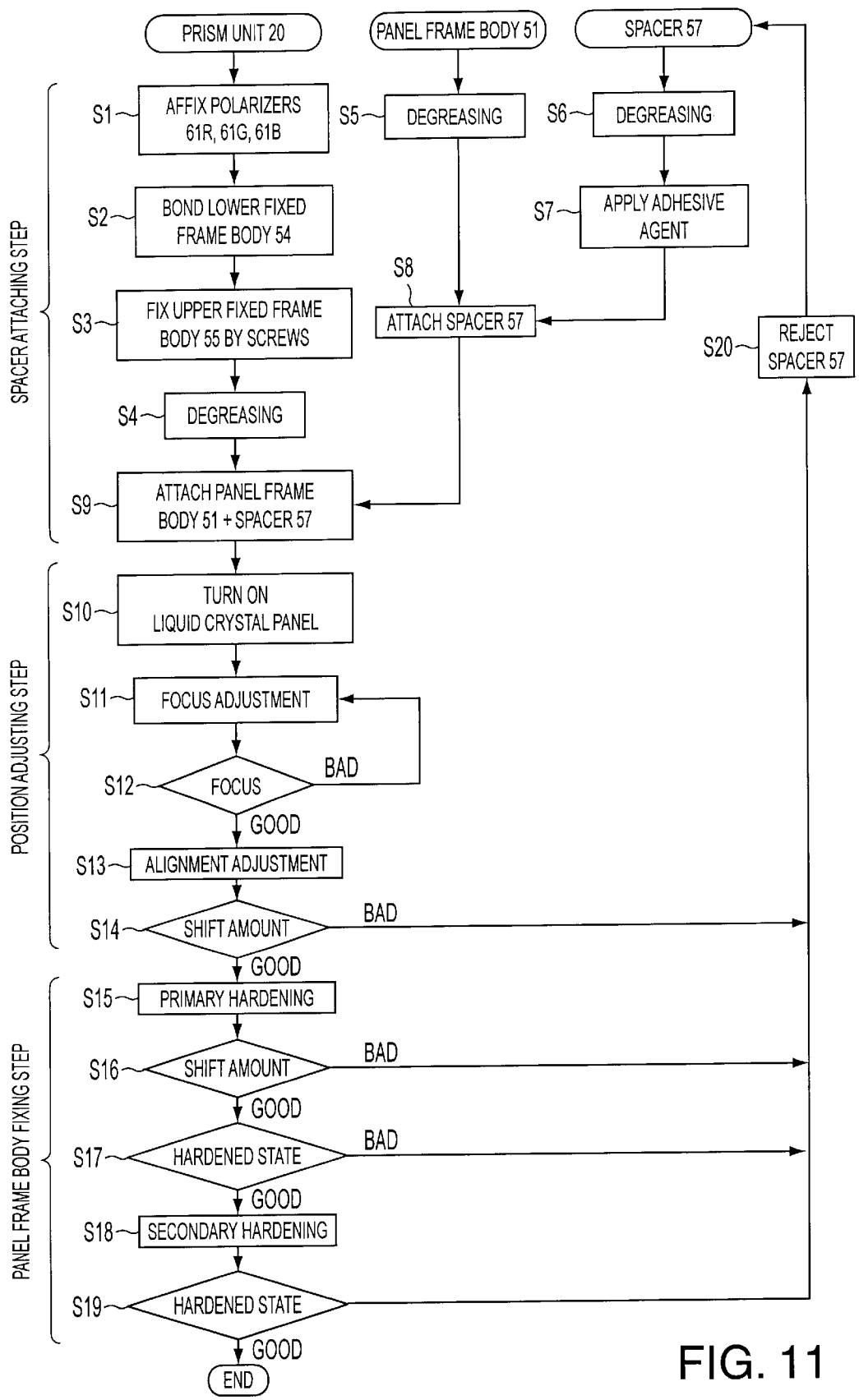
FIG. 11. is a flowchart showing a liquid-crystal-panel unit mounting method according to the embodiment of the present invention.

First, the polarizers 61R, 61G, and 61B are affixed by an adhesive agent to the light-incident-surfaces 22R, 22G, and 22B of the prism composition 22 of the prism unit 20 (step S1 shown in FIG. 11). Next, the lower fixed frame plate 54 is bonded to the light-incident-surfaces 22R, 22G, and 22B of the prism composition 22 (step S2 shown in FIG. 11), and then the upper fixed frame plate 55 is fixed by screws to the lower fixed frame plate 54 (step S3 shown in FIG. 11).

On the other hand, the spacer bonding portions 55f of the upper fixed frame plate 55 and the spacer guide planes 52e of the panel frame body 51 to which the spacers 57 are bonded, and the inclined planes 57a and the bottom faces 57b of the spacers 57 are degreased by alcohol or the like (steps S4, S5, and S6 shown in FIG. 11).

Next, the adhesive agent 58 is applied to the spacers 57 (step S7 shown in FIG. 11), and the spacers 57 are attached to the spacer guide planes 52e of the panel frame body 51 (step S8 shown in FIG. 11). In this state, the spacers 57 are merely attached by surface tension of the adhesive agent 58.

The attaching steps S7 and S8 for the spacers 57 may be substituted for steps involving applying the adhesive agent 58 to the spacer guide planes 52e, and the spacers 57 to which the adhesive agent is not applied being attached thereto. When substituting such steps, it is necessary to apply the adhesive agent 58 also to the spacer bonding portions 55f.

Next, the panel frame body 51 having the spacers 57 attached thereto is pushed toward the upper fixed frame plate 55 so as to be brought into closely contact therewith via the spacers 57 and the adhesive agent 58 (step S9 shown in FIG. 11).

Here, the liquid crystal panels 40R, 40G, and 40B are turned on (step S10 shown in FIG. 11). Then, focus adjustment is performed to adjust focus planes of the liquid crystal panels 40R, 40G, and 40B clamped by the panel frame body 51 to a focus plane of the projection lens 6. In this step S11, adjustment in three axes directions is performed using a position in the direction of the x-axis (x), an inclination (xθ) of a rotation direction with reference to the x-axis, and an inclination (yθ) of a rotation direction with reference to the y-axis when an optical axis of the projection lens unit 6 is taken as the z-axis, and two axes intersecting to the z-axis at right angles are taken as the x-axis and the y-axis. The adjustment is performed with reference to portions near liquid crystal layers of the liquid crystal panels 40R, 40G, and 40B. After the focus adjustment, a focus state is checked (step S12 shown in FIG. 11), and if the result of the focus adjustment is bad, the procedure returns to step S11 to perform the focus adjustment again.

In step S12, if the result of the focus adjustment is good, alignment adjustment is further performed to adjust the position of pixels of the liquid crystal panels 40R, 40G, and 40B (step S13 shown in FIG. 11). In this step S13, adjustment in three axes directions is performed using positions of the liquid crystal panels 40R, 40G, and 40B in the direction of the x-axis (x), positions in the y direction (y), and an inclination (zθ) of a rotation direction with reference to the z-axis when an optical axis of the projection lens unit 6 is taken as the z-axis, and two axes intersecting to the z-axis at right angles are taken as the x-axis and the y-axis. The alignment adjustment may preferably be performed with reference to one of the pixels of the three liquid crystal panels 40R, 40G, and 40B, however, it may be performed individually.

Figure 12A:
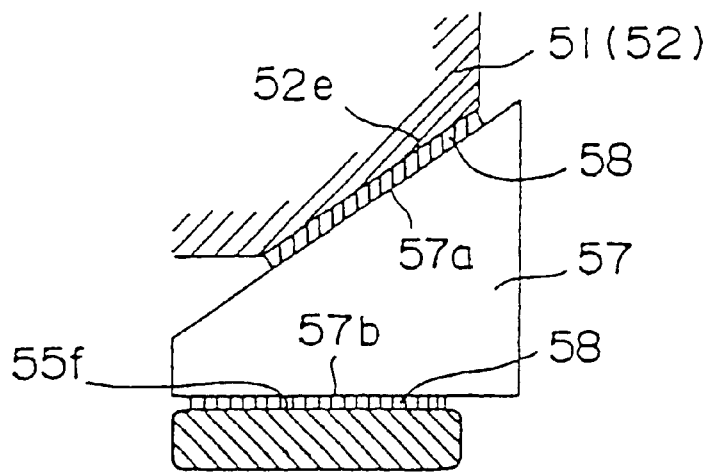
FIGS. 12(A)–12(C) include diagrams each showing a state of the spacer during adjusting a position of a panel frame body.
Figure 12B:
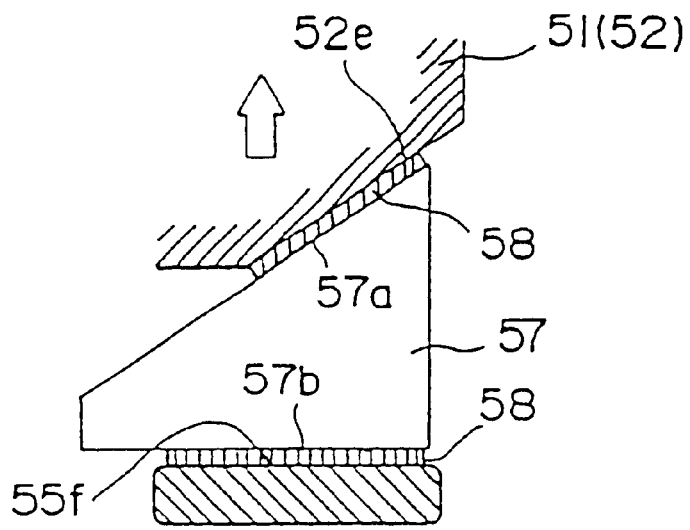
Figure 12C:
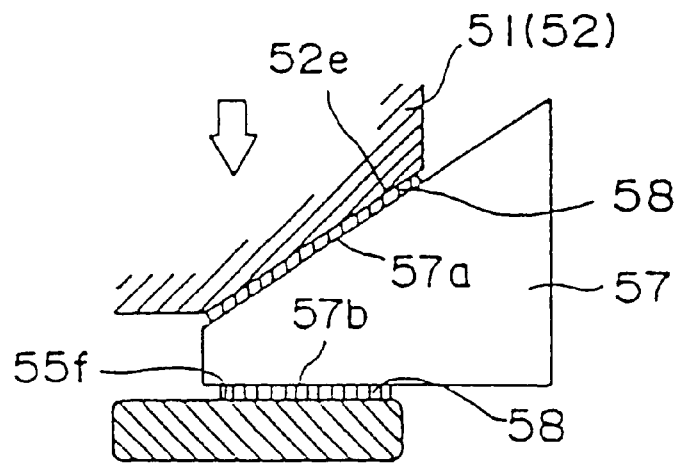

While performing the focus adjustment and the alignment adjustment, that is, while performing the adjustment of the position of the panel frame body 51 relative to the prism unit 20, the spacer 57 changes the position thereof in accordance with the action of the panel frame body 51 due to the adjusting operation while being held by surface tension of the adhesive agent 58 between the spacer guide plane 52e of the first frame body 52 and the spacer bonding portion 55f of the upper fixed frame plate 55, as shown in FIGS. 12(A) to 12(C).

In this case, if a clearance between a line passing through the center of the bonded surfaces of the upper fixed frame plate 55 and the spacer 57 and perpendicular to a mounting surface of the prism unit 20 and a line passing through the center of the bonded surfaces of the panel frame body 51 and the spacer 57 and perpendicular to the prism unit 20 is taken as C, the rotation moment exerted on the spacer 57 is the product of pressing force received by the spacer 57 from the panel frame body 51 and the clearance C.

Thus, in this embodiment, as shown in FIG. 9, the spacer bonding portion 55f of the upper fixed frame plate 55 is protruded toward the panel frame body 51 to reduce the clearance C, whereby the rotational moment exerted on the spacer 57 is reduced so that the spacer 57 is stabilized during the focus adjustment and the alignment adjustment.

After the alignment adjustment, the shift amount of the pixels of the liquid crystal panels 40R, 40G, and 40B is checked (step S14 shown in FIG. 11), and if the shift amount of the pixels is within the allowable range (good), primary hardening of the adhesive agent 58 between the spacers 57 and the panel frame body 51, and the adhesive agent 58 between the spacers 57 and the upper fixed frame plate 55, is performed (step S15 shown in FIG. 11). When a ultraviolet hardening-type adhesive agent is used for the adhesive agent 58, the hardening is performed by irradiating the adhesive agent with ultraviolet rays for a predetermined period. A period for irradiating the ultraviolet rays in this case varies with a type and an amount of the adhesive agent, however, the period is usually several tens seconds to several minutes.

When the shift amount is beyond the allowable range (bad), the spacers 57 are rejected (step S20 shown in FIG. 11) to be replaced with new spacers 57, and step S6 and subsequent steps are repeated.

Next, the shift amount of the pixels of the liquid crystal panels 40R, 40G, and 40B is checked again (step S16 shown in FIG. 11). When the shift amount is beyond the allowable range (bad), the spacers 57 are rejected (step S20 shown in FIG. 11) to be replaced with new spacers 57, and step S6 and subsequent steps are repeated, as in the case of step S14.

On the other hand, when the shift amount of the pixels is within the allowable range (good), the hardened state of the adhesive agent 58 between the spacers 57 and the panel frame body 51, and the adhesive agent 58 between the spacers 57 and the upper fixed frame plate 55 is checked (step S17 shown in FIG. 11). When the hardened state is bad, the spacers 57 are rejected (step S20 shown in FIG. 11) to be replaced with new spacers 57, and step S6 and subsequent steps are repeated, as in the case of step S14.

When the hardened state of the adhesive agent 58 is good, secondary hardening of the adhesive agent 58 between the spacers 57 and the panel frame body 51, and the adhesive agent 58 between the spacers 57 and the upper fixed frame plate 55 is performed (step S18 shown in FIG. 11).

It is also possible to complete the hardening only by one hardening step without performing the secondary hardening. However, it is more preferable from a viewpoint of enhancing throughput to divide the hardening step into two steps as in this embodiment.

In addition, it is more preferable from a viewpoint of increasing reliability to divide the hardening step into two steps, to determine the shift amount of the position and the hardened state before performing the secondary hardening, and to re-perform the steps when the shift amount and the hardened state are bad. Further, by re-performing the steps before performing the secondary hardening that provides complete hardening, the spacers 57 are easily removed.

Figure 13:
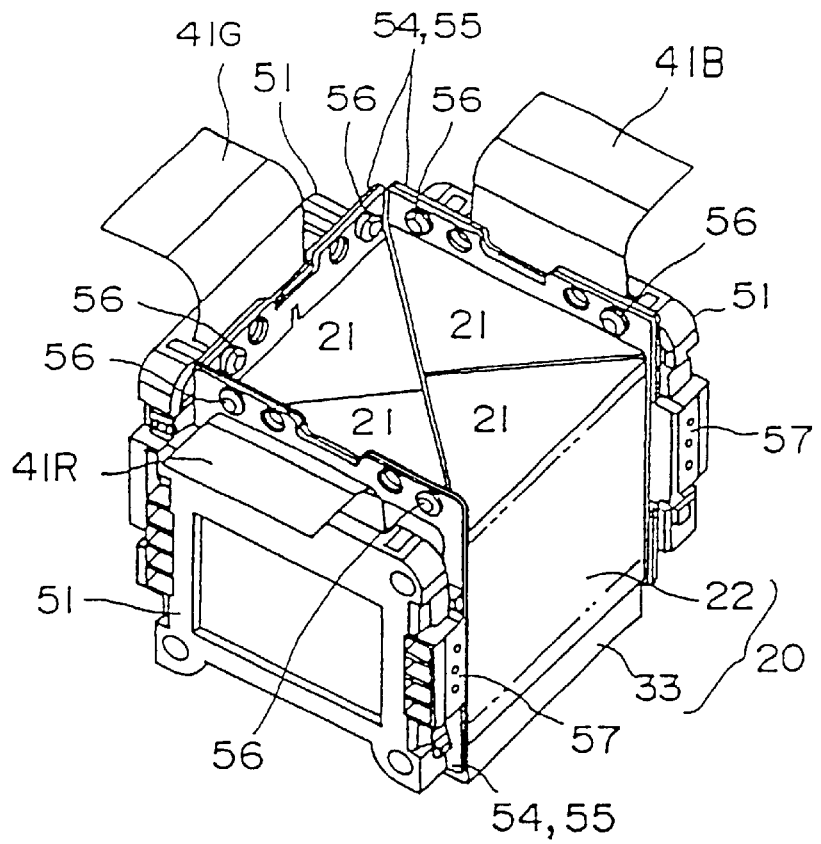
FIG. 13 is a perspective view showing a prism unit and a liquid-crystal-panel unit assembled in accordance with steps shown in FIG. 11.

After performing the secondary hardening, the hardened state of the adhesive agent 58 between the spacers 57 and the panel frame body 51 and the adhesive agent 58 between the spacers 57 and the upper fixed frame plate 55, is checked again (step S19 shown in FIG. 11). When the hardened state is bad, the spacers 57 are rejected (step S20 shown in FIG. 11) to be replaced with new spacers 57, and step S6 and subsequent steps are repeated, as in the case of step S14. On the other hand, when the hardened state is good, mounting of the liquid-crystal-panel units 50R, 50G, and 50B to the prism unit 20 is completed to be placed in an assembled state shown in FIG. 13.

Figure 16:
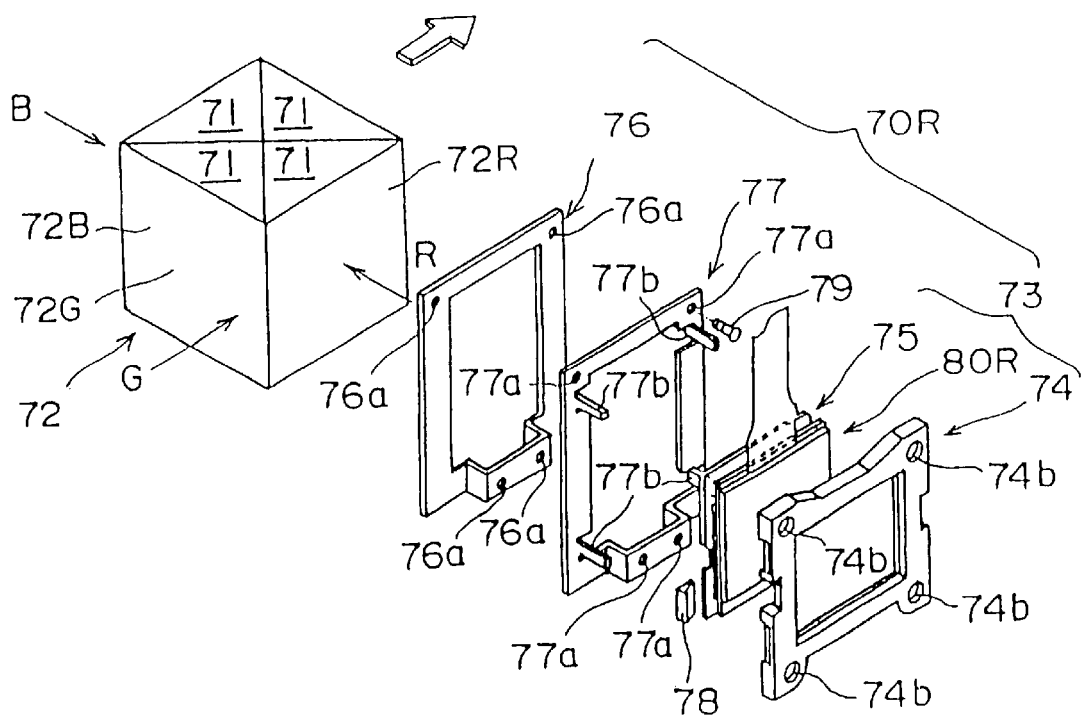
FIG. 16 is an exploded view showing a configuration of a liquid-crystal-panel unit of a conventional projection display device.
Figure 17:
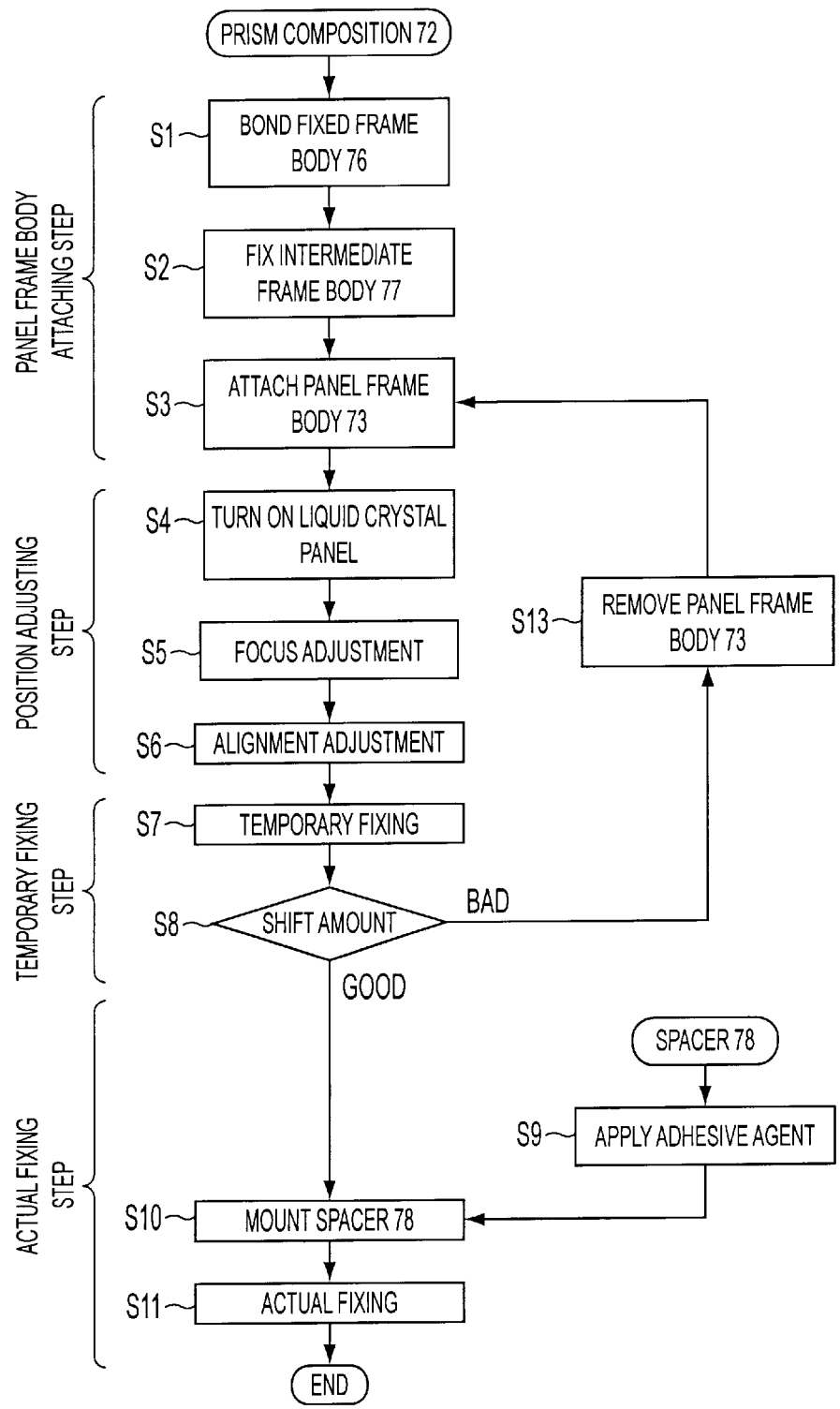
FIG. 17 is a flowchart showing a liquid-crystal-panel unit mounting method in the conventional projection display device.

The primary hardening and the secondary hardening of the adhesive agent shown in steps S15 and S18 shown in FIG. 11 is performed by dividing the hardening of the adhesive agent, which can actually performed in one step, into two steps. That is, the steps S15 to S18 shown in FIG. 11 are equivalent to the actual fixing (step S11 shown in FIG. 16) described in the conventional art, and the primary hardening of the adhesive agent (step S15 shown in FIG. 11) is different from the temporary fixing in the conventional art.

Figure 14:
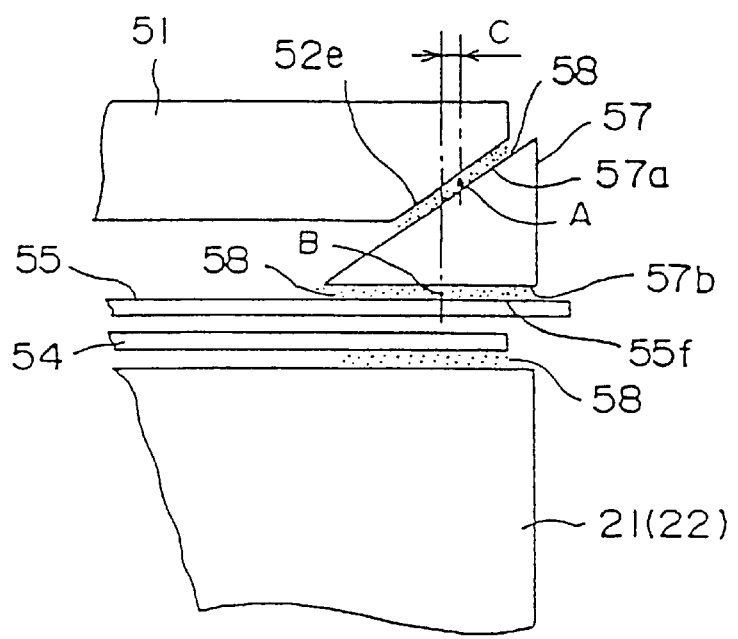
FIG. 14 is a schematic diagram showing a configuration around a spacer of a liquid-crystal-panel unit corresponding to FIG. 9 and showing another embodiment of the present invention.

FIG. 14 is a schematic diagram showing a configuration around a spacer of a liquid-crystal-panel unit corresponding to FIG. 9 and showing another embodiment of the present invention. This configuration is such that the spacer bonding portion 55f of the upper fixed frame plate 55 is protruded from the outer periphery of the prism composition 22 so that the bottom face 57b of the spacer 57 is stably placed on the spacer bonding portion 57f even if the spacer 57 is moved when the panel frame body 51 is positioned and adjusted.

Figure 15:
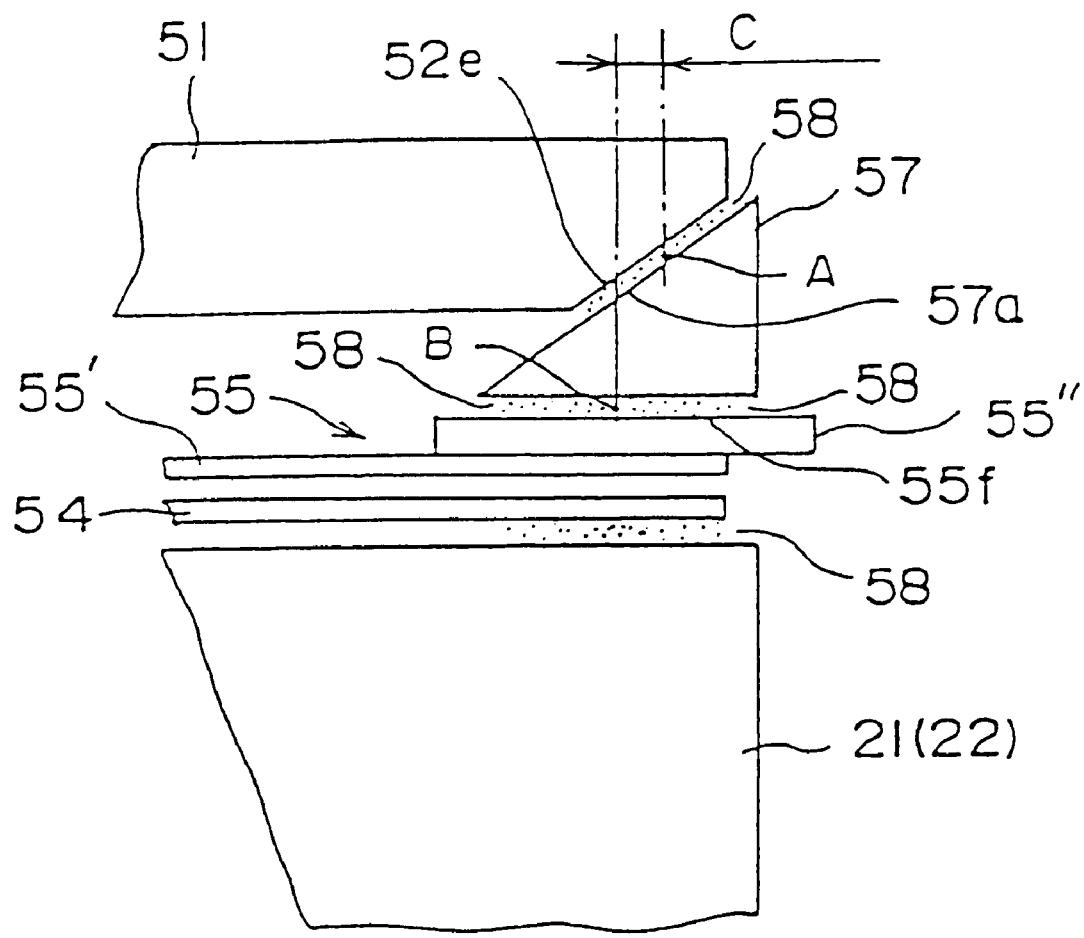
FIG. 15 is a schematic diagram showing a configuration around a spacer of a liquid-crystal-panel unit corresponding to FIG. 9 and showing a further embodiment of the present invention.

FIG. 15 is a schematic diagram showing a configuration around a spacer of a liquid-crystal-panel unit corresponding to FIG. 9 and showing a further embodiment of the present invention. This configuration is such that an iron plate 55" constituting a spacer bonding portion 55f is affixed to a base plate 55' to form an upper fixed frame plate 55. That is, in this configuration, the upper fixed frame plate 55 is not formed by bending the base plate 55', but the iron plate having a desired thickness and size (width and length) is attached to the base plate 55' by means of welding or the like so as to be used as the spacer bonding portion 55f.

According to this embodiment, the spacer bonding portion 55f having a desired shape for stabilizing the spacer 57 can be added, and by forming the spacer bonding portion 55f with a material having an intermediate linear expansion coefficient between those of the prism unit 20 and the panel frame body 51, the shift of pixels of the liquid crystal panel to be attached thereto can be effectively restricted.

It is proven experimentally that, in FIGS. 9, 14 and 15, if the central clearance C between the center A of the bonded surfaces of the panel frame body 51 and the spacer 57 and the center B of the bonded surfaces of the upper fixed frame plate 55 and the spacer 57 in the direction perpendicular to the mounting surface of the prism unit 20 is always maintained equal to or shorter than 2 mm, the rotational moment exerted on the spacer 57 during the position adjustment of the panel frame body 51 is substantially reduced, whereby the spacer 57 can be stabilized. If the clearance C is 0.5 to 1.5 mm, the spacer 57 is particularly stabilized.

While the present invention has been described above based on the embodiments, the present invention is not limited to the above-described embodiments, various modifications and changes can be made, and the modifications and changes are included in the present invention so long as they are within the technical idea.

For example, the following modifications can be made.

While an example has been described in the above embodiments in a case where the present invention is applied to a projection display device using a transmissive liquid crystal panel, it is possible to apply the present invention to a projection display device using a reflective liquid crystal panel. In addition, as described hereinbelow, the electro-optical device is not limited to the liquid crystal panel. Here, "transmissive" is defined such that the electro-optical device, such as a liquid crystal panel, is of a type for transmitting light, and "reflective" is defined such that the electro-optical device, such as a liquid crystal panel, is of a type for reflecting light.

According to the projection display device employing the reflective electro-optical device, a dichroic prism like the prism composition 22 may be used as a light separation unit for separating light into light of three colors of red, green, and blue, and may also be used as a light synthesizer for synthesizing and emitting modulated light of three colors in the same direction. In addition, a polarization beam splitter may be disposed between the electro-optical device and the color synthesizer. In the latter case, it is possible to apply the present invention to a configuration in which the electro-optical device is fixed to the surface of the polarization beam splitter. When the present invention is applied to the reflective projection display device, advantageous effects that are substantially similar to those of the transmissive projection display device can also be obtained.

In addition, the electro-optical device is not limited to the liquid crystal panel (such as a liquid crystal light valve), and may be, for example, a device using a micro-mirror, or a CCD (charge coupled device).

Also, the prism is not limited to the dichroic prism like the prism composition 22 in which two types of color-selecting planes are formed along the bonded surfaces of four triangular prisms, and may be a dichroic prism having one color-selecting plane, or a polarization beam splitter. In addition, the prism may be one in which a light-selecting plane is disposed in a light-transmitting box having a substantially hexahedron shape, and liquid is charged therein.

Further, the projection display devices include a front projection display device that performs projection from a direction in which a projected image is viewed, and a rear projection display device that performs projection from the side opposite to the direction in which the projected image is viewed, and the configuration shown in the above embodiments is applicable to either of them.

As described above, according to the invention of the present application, an increase in stability of a spacer allows a prism and an electro-optical device to be fixedly mounted by an adhesive agent only by a section where the spacer is placed, so that an increase in operation efficiency and simplification of the operation process can be achieved, and a decrease in the bonding sections resulting from the adhesive agent reduces a shift of pixels under the influence of heat.

In addition, an increase in elasticity of frame portions connected to a contacting surface of a fixed frame to the spacers allows the front and back of the spacer contacting portion to be elastically deformed so as to lighten the stress of a bonded portion, so that the shift of pixels under the influence of temperature can be reduced.

What is claimed is:

1. A projector, comprising:

an electro-optical device that modulates light;

a prism to which the electro-optical device is mounted;

a projection lens positioned at a front of the electro-optical device that projects modulated light;

a fixed frame plate fixed adjacent to a surface of the prism and a center portion thereof being opened;

an electro-optical device frame body that holds the electro-optical device; and a spacer having a plane opposed to the fixed frame plate and a plane opposed to the electro-optical device frame body, and placed between the fixed frame plate and the electro-optical device frame body, the fixed frame plate and the electro-optical device frame body being bonded and fixed by an adhesive agent via the spacer and a spacer bonding portion, that is bonded to the spacer corrected to a surface of the fixed frame plate and protruding toward the electro-optical device frame body.

2. The projector to claim 1, a width of a frame portion connected to the surface of the fixed frame plate that is bonded to the spacer being narrower than a width of the surface of the fixed frame plate that is bonded to the spacer.

3. The projector according to claim 1, the surface of the fixed frame plate that is bonded to the spacer being formed by a plate added to a base plate of the fixed frame plate.

4. A projector, comprising:

an electro-optical device that modulates light;

a prism to which the electro-optical device is mounted;

a projection lens positioned at a front of the electro-optical device that projects modulated light;

a fixed frame plate fixed adjacent to a surface of the prism and a center portion thereof being opened;

an electro-optical device frame body that holds the electro-optical device; and a spacer having a plane opposed to the fixed frame plate and a plane opposed to the electro-optical device frame body, and placed between the fixed frame plate and the electro-optical device frame body, the fixed frame plate and the electro-optical device frame body being bonded and fixed by an adhesive agent via the spacer and a spacer bonding portion, that is bonded to the spacer connected to a surface of the fixed frame plate and protruding from the outer periphery of the prism.

5. The projector according to claim 4, a width of a frame portion connected to the surface of the fixed frame plate that is bonded to the spacer being narrower than a width of the surface of the fixed frame plate that is bonded to the spacer.

6. The projector according to claim 4, the surface of the fixed frame plate that is bonded to the spacer being formed by a plate added to a base plate of the fixed frame plate.

7. A projector, comprising:

an electro-optical device that modulates light;

a prism having a surface to which the electro-optical device is mounted; and a projection lens positioned at a front of the electro-optical device that projects modulated light;

a fixed frame plate fixed adjacent to a surface of the prism and a center portion thereof being opened;

an electro-optical device frame body that holds the electro-optical device; and a spacer having a plane opposed to the fixed frame plate and a plane opposed to the electro-optical device frame body, and placed between the fixed frame plate and the electro-optical device frame body, the fixed frame plate and the electro-optical device frame body being bonded and fixed by an adhesive agent via the spacer, and a clearance between a line passing through a center of the bonded surfaces of the fixed frame plate and the spacer and perpendicular to a surface of the prism and a line passing through a center of the bonded surfaces of the electro-optical device frame body and the spacer and perpendicular to the surface of the prism, being equal to or less than 2 mm.

8. The projector according to claim 7, a width of a frame portion connected to the surface of the fixed frame plate that is bonded to the spacer being narrower than a width of the surface of the fixed frame plate that is bonded to the spacer.

9. The projector according to claim 7, the surface of the fixed frame plate that is bonded to the spacer being formed by a plate added to a base plate of the fixed frame plate.

10. An electro-optical device mounting unit for mounting an electro-optical device for modulating light to a prism, comprising:

a fixed frame plate fixed adjacent to a surface of the prism and a center portion thereof being opened;

an electro-optical device frame body that holds the electro-optical device; and a spacer having a plane opposed to the fixed frame plate and a plane opposed to the electro-optical device frame body, and placed between the fixed frame plate and the electro-optical device frame body, the fixed frame plate and the electro-optical device frame body being bonded and fixed by an adhesive agent via the spacer and a spacer bonding portion, that is bonded to the spacer connected to a surface of the fixed frame plate and protruding toward the electro-optical device frame body.

11. The electro-optical device mounting unit according to claim 10, a width of a frame portion connected to the surface of the fixed frame plate that is bonded to the spacer being narrower than a width of the surface of the fixed frame plate that is bonded to the spacer.

12. The electro-optical device mounting unit according to claim 10, the surface of the fixed frame plate that is bonded to the spacer being formed by a plate added to a base plate of the fixed frame plate.

13. An electro-optical device mounting unit for mounting an electro-optical device for modulating light to a prism, comprising:

a fixed frame plate fixed adjacent to a surface of the prism and a center portion thereof being opened;

an electro-optical device frame body that holds the electro-optical device; and a spacer having a plane opposed to the fixed frame plate and a plane opposed to the electro-optical device frame body, and placed between the fixed frame plate and the electro-optical device frame body, the fixed frame plate and the electro-optical device frame body being bonded and fixed by an adhesive agent via the spacer and a spacer bonding portion, that is bonded to the spacer, connected to a surface of the fixed frame plate and protruding from the outer periphery of the prism.

14. The electro-optical device mounting unit according to claim 13, a width of a frame portion connected to the surface of the fixed frame plate that is bonded to the spacer being narrower than a width of the surface of the fixed frame plate that is bonded to the spacer.

15. The electro-optical device mounting unit according to claim 13, the surface of the fixed frame plate that is bonded to the spacer being formed by a plate added to a base plate of the fixed frame plate.

16. An electro-optical device mounting unit for mounting an electro-optical device for modulating light to a prism, comprising:

a fixed frame plate fixed adjacent to a surface of the prism and a center portion thereof being opened;

an electro-optical device frame body that holds the electro-optical device; and a spacer having a plane opposed to the fixed frame plate and a plane opposed to the electro-optical device frame body, and placed between the fixed frame plate and the electro-optical device frame body, the fixed frame plate and the electro-optical device frame body being bonded and fixed by an adhesive agent via the spacer, and a clearance between a line passing through a center of the bonded surfaces of the fixed frame plate and the spacer and perpendicular to a surface of the prism and a line passing through a center of the bonded surfaces of the electro-optical device frame body and the spacer and perpendicular to the surface of the prism, being equal to or less than 2 mm.

17. The electro-optical device mounting unit according to claim 16, a width of a frame portion connected to the surface of the fixed frame plate that is bonded to the spacer being narrower than a width of the surface of the fixed frame plate that is bonded to the spacer.

18. The electro-optical device mounting unit according to claim 16, the surface of the fixed frame plate that is bonded to the spacer being formed by a plate added to a base plate of the fixed frame plate.

* * * * *